J. H. BOWDEN & H. F. J. THOMPSON.
PROTECTION OF ELECTRIC CABLES.
APPLICATION FILED MAR. 15, 1916.

1,257,452.

Patented Feb. 26, 1918.
5 SHEETS—SHEET 1.

Inventors:
J. Horace Bowden
and H. F. J. Thompson
by Eugene C. Brown
Attorney

Inventors:
J. Horace Bowden
and H. F. J. Thompson
by Eugene C. Brown
Attorney

UNITED STATES PATENT OFFICE.

JOHN HORACE BOWDEN, OF LONDON, AND HARRY F. J. THOMPSON, OF BATTERSEA PARK, LONDON, ENGLAND.

PROTECTION OF ELECTRIC CABLES.

1,257,452.  Specification of Letters Patent.  Patented Feb. 26, 1918.

Application filed March 15, 1916. Serial No. 84,387.

*To all whom it may concern:*

Be it known that we, JOHN HORACE BOWDEN, a subject of the King of Great Britain, residing at 101 Eltham road, London, S. E., England, and HARRY FRANCIS JACKSON THOMPSON, a subject of the King of Great Britain, residing at 65 Cambridge Mansions, Battersea Park, London, S. W., England, have invented new and useful Improvements in the Protection of Electric Cables, of which the following is a specification.

The present invention relates to the protection of electric cables against leakage and faults in the insulation. The invention comprises systems for cutting out lengths of faulty cable and constructions of cable particularly designed for such systems to be applied thereto. The main conductors of the cable are separated from one another by means of an insulated conductive shield interposed between them, and the whole of the main conductors of the cable is also surrounded by an insulated shield, the shields being employed for automatically cutting off the electric supply from the cable in case of a fault. The main purpose of the present invention is to provide an extremely simple system which insures that any faulty section of the main cable is cut off at one or both ends of the faulty length, and before the main conductors have become short-circuited between themselves, or before there is a short-circuit from any one or all of the conductors to earth, so that the usual disturbance of the system resulting from such short-circuiting and earthing is prevented.

The object of the invention comprises means for causing leakage current from any of the conductors to any other conductor, or from any of the conductors to earth, to be intercepted by one or other of the conductive shields and directed through one or more relays which either directly or through a tripping circuit trips the main switches supplying the cable. The shields interposed between the conductors and also the shield surrounding the whole cable are maintained at a different potential from earth potential so that if the cable is damaged from the outside, for example by a workman's pick, the outer shield is earthed, and as it is at a certain potential different from earth potential a current passes through the relays and opens the main switches controlling the supply to the cable.

In the case of a cable supplied from both ends it is convenient to join the external shield at one end to the shields between the conductors directly through a relay which in case of leakage or of earthing of either shield closes the circuit of a tripping coil and consequently opens the main switch. At the other end, two relays may be employed, one terminal of each being connected to the shield between the conductors and the outer shield respectively, while the opposite ends are joined together through the secondary winding of an alternating current transformer, the primary winding being supplied from a suitable source of alternating current supply. The mid-point of the secondary winding is connected to earth and the two portions of the secondary winding are wound in opposite directions so that substantially equal opposing potentials are supplied respectively to the shield between the conductors and the outside shield. If there is a fault in the cable these relays will be energized and their armatures will directly close the circuit of the tripping coil of the main switch. If there is a fault substantially nearer one relay than the other, it is possible that the bulk of the leakage current will be carried through this relay. When this relay is energized it breaks the circuit through it connecting one of the shields and the secondary of the transformer, and immediately this is done no current can pass to earth through this relay any more, but all the current is diverted through the other relay and a relay at the far end of the cable in spite of the normally greater resistance of this path before the other relay had attracted its armature.

In summary, the idea of breaking, at one end of the cable, the circuits connecting one of the shields to the secondary of the transformer, is to divert the current leaking from the conductors, through the relay at the opposite end of the cable, in case of a fault close to the first end. If either shield is short-circuited to earth at this end the transformer with the double-wound secondary will insure current passing immediately through the relay at the far end of the cable as the voltage of the half of the secondary of the transformer connected to the sound shield is not reduced owing to the leakage current at the fault although the voltage of the half connected to the fault is reduced and would not in itself be capable of allowing much current to pass through the far relay.

The system can readily be applied to the protection of branch feeders or to a simple feeder supplied from one end, or to the protection of ring mains, and a particularly simple form of the system may be employed in the case of short lengths of cable supplied from each end.

A further object of the invention is a cable specially designed for use in the above described systems. Of course, the form of cable having a conductive shield surrounding each conductor of the cable and a further conductive shield surrounding the whole of the cable can be employed. It is found in practice, as might be expected, that induced currents are set up in these shields when, of course, the cables are employed on alternating current supply. The cable in accordance with the present invention prevents the formation of such induced currents.

More particularly defined, this part of the invention consists in providing a cable with a shield separating the different conductors and substantially neutralized in regard to currents induced in the shield by the current passing in neighboring main conductors. In other words, the resultant effect of the current passing in all the main conductors of the cable as regards induced current in the separating shields is *nil*.

Yet a further object of the invention consists in a cable provided with an insulated conductive shield separating the conductors of the cable and constructed in the form of a number of radial portions radiating substantially from the center of the cable.

Some embodiments of the present invention are illustrated in the annexed drawings, in which—

Figure 1 is a cross section of a cable to which the invention may be applied;

Fig. 2 is a diagrammatic view of the end of a cable made in accordance with the invention;

Fig. 3 being a cross section of Fig. 2 on the line III—III;

Figs. 4 and 5 are cross sections showing the invention applied to other forms of cable;

Referring now to the drawings, in all the examples of electrical connections given, the invention is shown applied to a three-phase three-core cable, and in all the figures of the drawings, except Figs. 4 and 5, the conductors are referred to by the reference characters 1, 2, 3, respectively, and the protecting shield surrounding all the conductors by the reference numeral 9. In Fig. 1, the shields separating the conductors 1, 2, 3 consist of three metallic sleeves 7 entirely surrounding each conductor and in electrical contact so as to form a single shield as far as electrical considerations are concerned.

Owing to the inherent disadvantages of this construction, the invention provides special cables adapted to the new protection systems and illustrated in Figs. 2 to 5.

In Figs. 2 and 3 a three-core cable applicable to a three-phase supply is shown. The three conductors 1, 2, 3 are of ordinary form and are surrounded by insulating layers 4, 5, 6. Between each of these layers there is a metallic protecting shield 7 which, as can readily be seen, consists substantially of three straight portions projecting from the center of the cable. The arrangements shown in Figs. 4 and 5 are substantially the same, except that in Fig. 4 there are two cores 113, 114 and in Fig. 5 four cores 115, 116, 117 and 118, and in the two cases a corresponding number of parts to the metallic shield 7.

The shield 7 can be formed of a suitable number of pieces of metallic braid or sheet, or a number of small wires or strips. The advantage of such constructions is that they allow of a good deal more flexibility in the cable for bending purposes than a solid internal shield would do. Outside the complete cores there is an additional insulation portion 8, then the outside shield 9, which may be of copper tape or strips to meet the official requirements of the British board of trade. There is then the final insulating layer 11, and the lead sheathing 12 which is earthed in accordance with the board of trade regulations.

Figure 6:
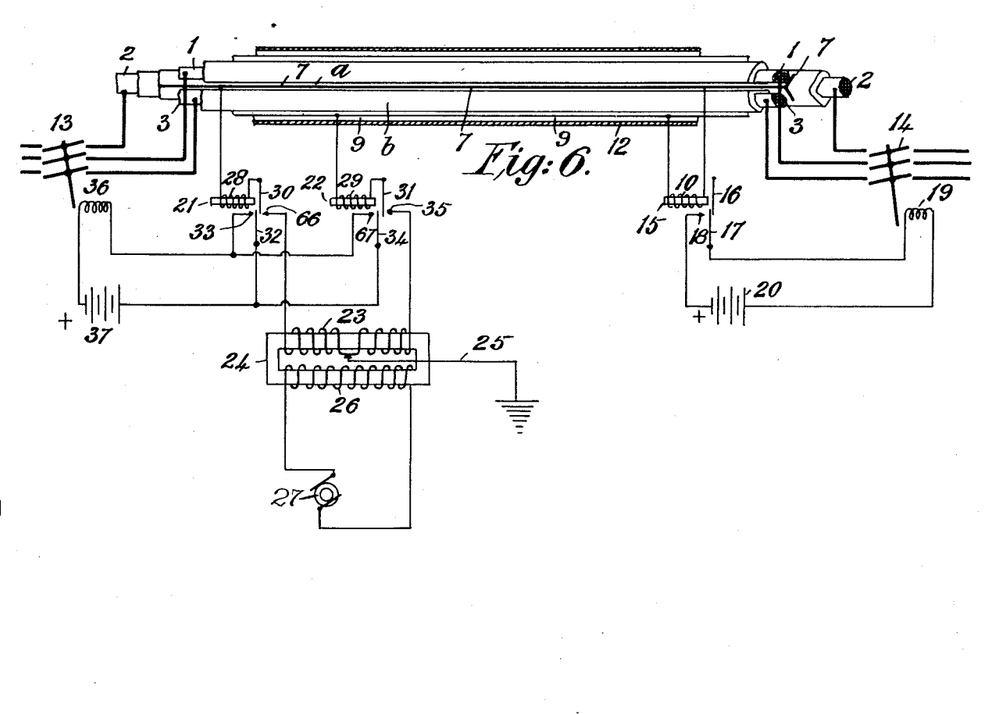
Fig. 6 is a diagram of connections for a cable supplied from both ends.

In Fig. 6 a cable supplied from both ends is shown which can be isolated at both ends by means of the three-pole oil switches 13, 14 which are arranged in the conductors feeding the conductors 1, 2, 3 of the cable. At the right hand end of this cable the shield 7 between the conductors and the outer shield 9 are connected together through the winding 10 of a relay 15. If the outer shield 9 becomes earthed due to damage from the outside, owing to the potential of the two shields, current will flow through the winding 10 of the relay 15, the armature 16 being attracted and bringing the spring 17 on to the contact 18. This closes the circuit of a tripping coil 19 as follows: from battery 20, through contacts 17, 18, through coil 19 back to the battery. Hence coil 19 is energized and opens the oil switch 14.

At the other end of the cable the inner shield 7 is connected to one pole of the relay 21, while the outer shield 9 is connected to one pole of the relay 22. The other pole of relay 21 is connected through armature 30 and back contact 66 to one end of the secondary winding 23 of the transformer 24, and the other pole of relay 22 is connected similarly through armature 31 and back contact 35 to the opposite end of winding 23. The middle of winding 23 is earthed by means of a conductor 25, as shown, and the two halves of winding 23 are wound in opposite directions so that two substantially equal and opposing E. M. F.'s are generated in the secondary winding 23 and are applied to the inner shield 7 and outer shield 9 respectively, the primary winding 26 of transformer 24 being supplied from any suitable source of alternating current 27. If the inner shield 7 or the outer shield 9 has a leak to earth there is a circuit from earth through the fault to one of these shields through the winding of relay 21 or 22, through half the secondary winding of transformer 24, back to earth. Suppose first the fault is at $a$, then the relay 21 is probably energized first by current passing through its winding 28, and possibly not sufficient current will pass through 10 to energize it. The armature 30 is attracted and contact arm 32 is brought on to contact 33, the circuit of tripping coil 36 and battery 37 is closed, and the switch 13 is opened and the cable cut off. At the same time, the circuit of relay 28 is broken at the back contact 66 and the current is obliged to take the alternative path viz:—from earth to shield 7, winding 10, shield 9, winding 29, the other half of the secondary winding of transformer 24, back to earth. Hence switch 14 is opened and immediately afterward this circuit is broken at back contact 35. Under some circumstances, for example, if the fault occurred at $b$ grounding the outside shield practically the whole of the leakage current may pass through the winding 29 of relay 22 to earth and then the armature 31 is attracted and is withdrawn from the contact 35. Hence connection to earth through this relay is interrupted at the point 35, and the whole of the leakage current is obliged to go through the winding 10 of relay 15 and the winding 28 of relay 21 with the result just indicated. As in the other case the circuit of coil 36 is closed, this time by arm 34 and contact 67. Likewise it will be easily seen that by reason of the grounding connection through the secondary 23 to the shields above described, if there is any leakage from any of the main conductors of the cable to either the outside shield or the internal shield, such leakage current will pass to ground through the path mentioned, and if of sufficient value, the relay 28 or 29 will be operated.

Figure 7:
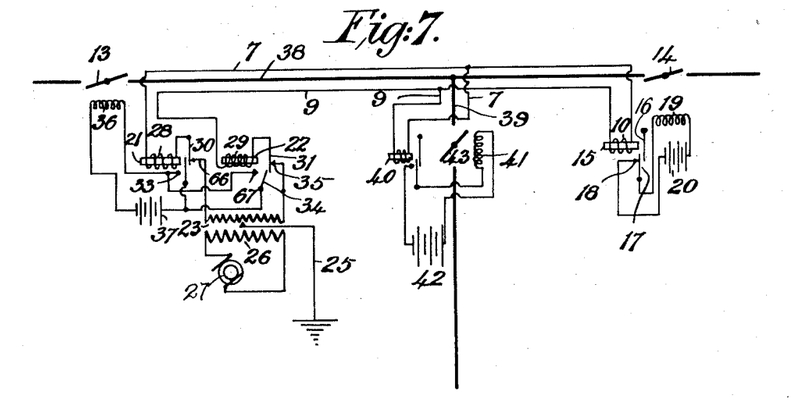
Fig. 7 is a rudimentary diagram of connections of the invention applied to the protection of a branch feeder.
Figure 11:
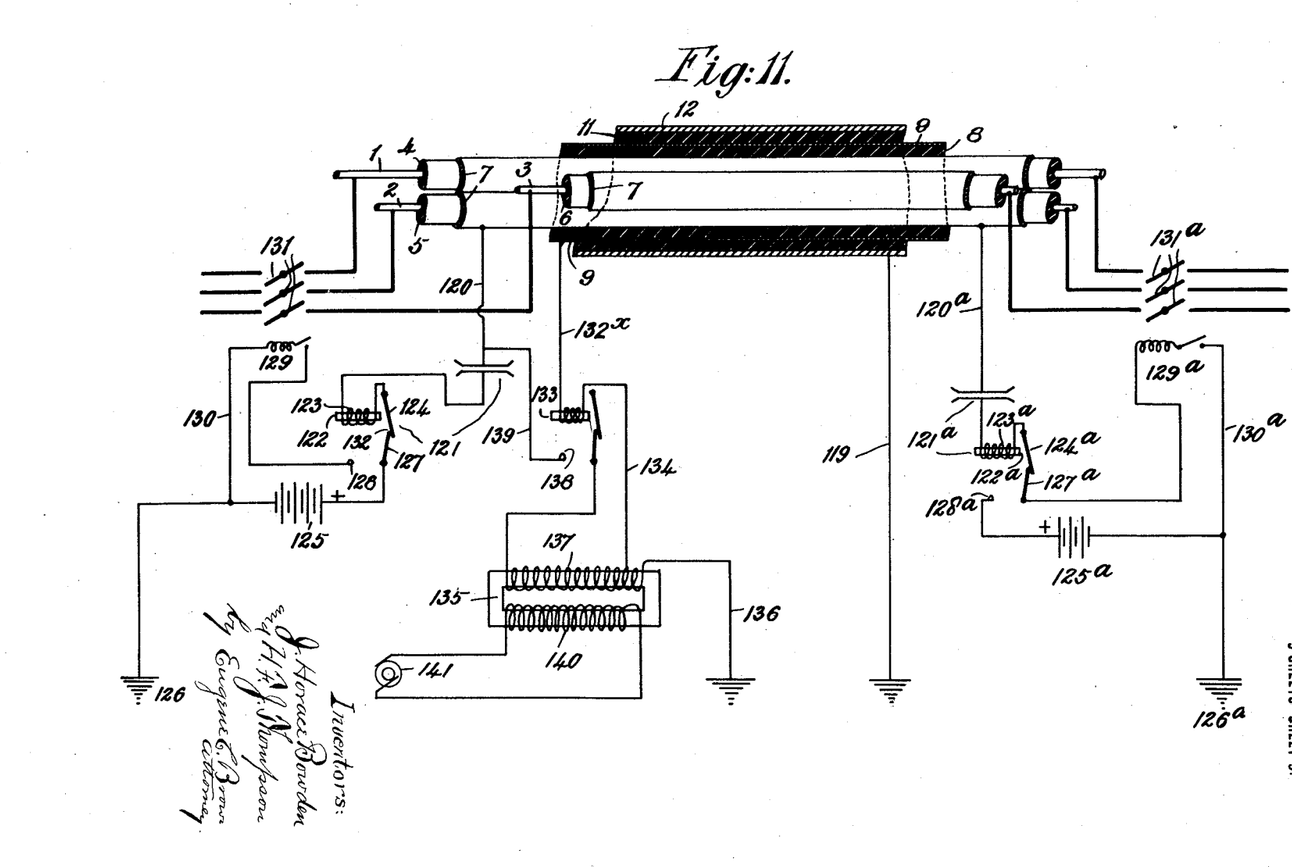
Fig. 11 shows a typical diagram of connections for a modified system of protecting a length of cable at both ends.

In the arrangement shown in the remaining figures of the drawings, except in Fig. 11, all the conductors of the cable are conventionally shown by a single line 38. In Fig. 7 which shows the arrangement for a branch feeder, at the left hand end of the main cable the arrangement is the same as that at the left hand end of Fig. 6, and corresponding reference characters are employed. Also at the right hand end of the cable the arrangement is exactly the same as at the right hand end of Fig. 6, and here again the same reference numerals have been employed. At the point of supply of the branch feeder 39, however, an arrangement is employed exactly the same as that shown at the right hand end of the main cable, that is to say, the inner shield 7 and outer shield 9 are connected through the winding of relay 40, and when there is leakage this relay closes the circuit of tripping coil 41 and battery 42 and consequently this tripping coil opens the switch 43 and isolates the branch feeder.

Figure 8:
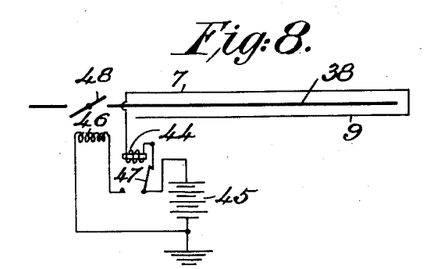
Fig. 8 shows the system applied to a simple feeder only supplied from one end.

In Fig. 8 a simple arrangement is shown for the protection of a cable supplied only at one end. As can be seen, the inner shield 7 is directly connected to the outer shield 9 at the right hand end, and at the left hand end the shield 7 is connected through the winding of relay 44 to battery 45 the other pole of which is earthed. It is evident that by this means both the inner shield 7 and the outer shield 9 are maintained at a definite potential above or below earth, and if there is any leak between either shield and earth a current will flow through the winding of relay 44, this relay will attract its armature, pushing over the arm 47 which will close the contacts in the circuit of tripping coil 46 so that a circuit from the same battery 45 through coil 46 is completed and the switch 48 is opened and the length of cable isolated.

Figure 9:
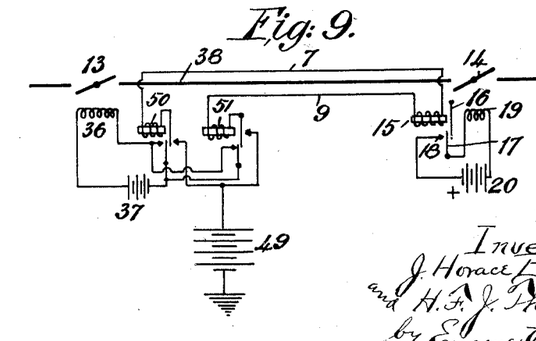
Fig. 9 is a simplified construction in accordance with the invention applied to a short length of feeder supplied from both ends.

Fig. 9 shows an arrangement for a short length of feeder supplied from both ends.

At the right hand end the arrangement is identical with the right hand end of Fig. 6 or Fig. 7, and the same reference characters have been applied. The action is exactly the same, switch 14 being tripped by coil 19 when there is any leakage. At the left hand end, however, there is a slight difference. The outer and inner shields 9 and 7 are maintained at the same potential in this instance by means of battery 49 having one pole earthed and the other pole connected through one relay 50 to the inner shield 7 and through another relay 51 to the outer shield 9. The relays 50 and 51 have exactly the same function as the relays 21 and 22 in Fig. 6, and the operation, when there is leakage from the conductors to the shields or the outer shield is earthed through external damage to the cable, will be exactly the same as that in connection with the system shown in Fig. 6.

Figure 10:
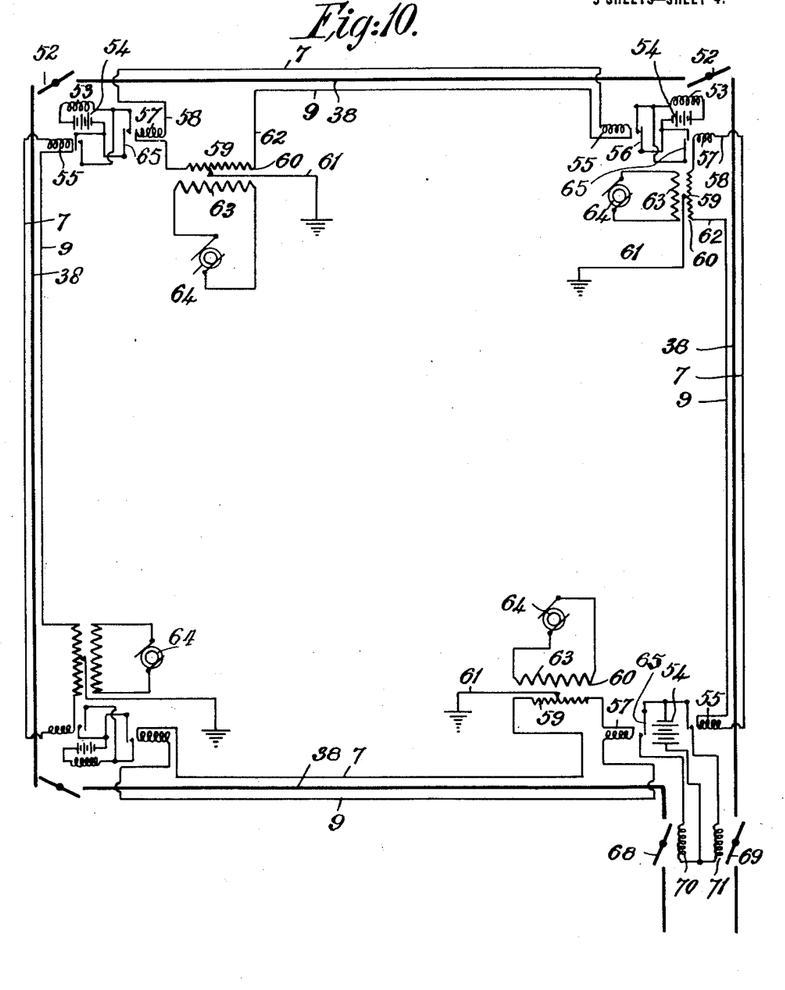
Fig. 10 shows an embodiment of the invention applied to the protection of a ring main.

In Fig. 10 the invention is shown applied to a ring main consisting of four sections 38. The application of the invention to this case can readily be followed by considering the preceding examples. At each corner of the ring the connections are substantially the same. In each corner, except the right hand lower corner where power is introduced, there is a switch 52 provided with a tripping coil 53 which is very similar to the coil shown in the previous examples, being in circuit with the battery 54 and relay contacts which will be dealt with below. At each of these corners there are two relays; first of all a relay 55 simply connected between the inner shield 7 and the outer shield 9. This has exactly the same function as the relay shown to the right of Fig. 6 and can itself by attracting its armature 56 complete the circuit of battery 54 and coil 53 as can readily be seen. In addition there contact in parallel with this contact in circuit with battery 54 and coil 53, and this contact is operated, as may be easily seen, by the relay 57. This relay is connected up in substantially the same manner as the second relay in the other constructions, that is to say, one pole of it is connected to the inner shield 7 by means of the conductor 58, and the other terminal is connected to one end of the secondary winding 59 of an alternating current transformer 60. The mid-point of the secondary winding 59 of this transformer is connected to earth by conductor 61, and the other terminal of the secondary winding 59 is connected to the outer shield 9 by means of conductor 62. At the lower right hand corner, two switches 68, 69 in the two cables respectively have to be employed. These switches have tripping coils 70, 71 which are connected to the battery 54 in substantially the same manner as the tripping coils at the other corners.

In this arrangement therefore the inner and outer shields are maintained at substantially equal and opposing potentials because the primary windings 63 of the transformer 60 are, as before, supplied by a suitable source of alternating current 64. Hence if there is any leak from the conductors to earth, or from one conductor to another, relay 57 will be excited and by attracting its armature 65 the second contact will be closed in the circuit of battery 54 and coil 53. Hence this latter will trip the switches 52 and isolate the main.

In Fig. 11 of the drawings, the cable shown corresponds with that shown in cross section in Fig. 1, that is to say, the conductors 1, 2, 3 are surrounded by insulation portions 4, 5, 6 and again by sleeve-shaped shields 7 which are in metallic contact. Outside these shields is the insulating material 8, then the surrounding shield 9, more insulating material 11. and finally the outer sheath 12. The lead sheathing 12 is earthed according to the Board of Trade regulations by the conductor 119. The metallic shields 7 are connected by the conductor 120 to the electrostatic relay 121 which in the drawing is shown as a simple spark gap in series with the electromagnetic relay 122, the winding 123 of which is connected through the armature 124, battery 125 to earth at 126. Hence if a fault is developed between any of the phases 1, 2, 3, relay 122 will be energized and its armature 124 will cause the arm 127 to fall on to the contact 128 and will complete the following circuit: from battery 125, through arm 127, contact 128, electromagnet 129, conductor 130, back to battery 125. Hence electromagnet 129 which serves as a tripping coil is energized and opens the three-pole switch 131 which is in the supply leads to the cable, and hence the latter is cut off.

At the same time the circuit is broken at point 132 and the leakage current is diverted through the relay at the far end of the section of cable at which there is a similar arrangement. Here the parts are marked 120ª, 121ª etc. so that by following the description above the operation of this end can be closely followed. At this end the switch 131ª is opened and hence the section of cable is isolated at both ends, which is important in such cases as, for example, when the section of cable is in parallel with other feeders.

In addition to that described above, there is another arrangement for dealing with faults due to external damage. The outside shield 9 is connected by conductor 132ˣ to a relay 133 and thence by conductor 134 through a small part of the secondary winding of the transformer 135, and then by conductor 136 to earth. The larger part of the secondary winding 137 of the transformer 135 is connected through back contact 138 of relay 133 by conductor 139 to the conductor 120. The primary winding 140 of transformer 135 is supplied by such an alternating current supply 141 that there is a voltage of say 20 volts or any other desired voltage between the tapping points of the conductors 134 and 136, while there is a difference of potential of about 300 volts or any other desired voltage in the whole of the secondary winding 137. Hence when a fault occurs and relay 133 is energized it places a voltage of about 300 volts or any other pre-arranged voltage on to the inner shields 7 by way of conductor 120, and hence causes the electrostatic relay 121, 121ª to operate exactly as in the first mentioned case.

Some examples of the application of the present invention have been given above, but it will be found that the invention is equally applicable to practically every distribution system of cables that can be imagined. The invention, if so applied, can be modified in various details as will be obvious to those conversant with cable systems.

What we claim is:

1. In a protective system, in conjunction with an electric cable having a plurality of conductive cores, the combination of an insulated conductive shield separating said conductive cores from one another, an insulated conductive shield surrounding the whole of said cores, means for impressing equal but opposing electro-motive forces upon said shields, a relay in said connection, and switching means in connection with said cable in operative connection with said relay.

2. In a protecting system in conjunction with a cable having a plurality of conductive cores, the combination of a conductive shield separating said conductive cores, a conductive shield surrounding the whole of said cores, means for impressing equal but opposing electro-motive forces upon said shields, and switching means in connection with said cable operated upon substantial leakage arising in all said conductive members.

3. In a protecting system in conjunction with an electrical cable having a plurality of conductive cores, the combination of an inner shield separating said conductive cores, an outer shield surrounding the whole of said cores, a transformer having a secondary winding divided into two portions wound in opposition, an earthed connection to the junction point of the two portions of said secondary winding, connections between the terminals of said secondary winding and said inner and outer shields respectively, a source of alternating current supply in electrical connection with the primary winding of said transformer, a relay in one of said connections between the secondary winding of said transformer and said shields, and switching means in connection with said cable in operative connection with said relay.

4. In a protecting system in conjunction with an electrical cable having a plurality of conductive cores, the combination of an inner shield separating said conductive cores, an outer shield surrounding the whole of said cores, a transformer having a secondary winding divided into two portions wound in opposition, an earthed connection to the junction point of the two portions of said secondary winding, connections between the terminals of said secondary winding and said inner and outer shields respectively, a source of alternating current supply in electrical connection with the primary winding of said transformer, a relay in each of said connections between the secondary winding of said transformer and the respective shields, and means operable by either of said relays for cutting off the supply to the cable.

5. An electrical system comprising a section of cable, a conductive shield disposed in relation to a conductor of said cable as to receive leakage current therefrom upon a fault arising in the latter, an earthed connection to said shield at each end of the section of cable, means for impressing opposing electro-motive forces upon said respective connections, a relay in each of said connections, said relays being adapted to open their contacts when excited and thereby to open one branch of a parallel circuit, switching means at each end of said section of cable each in operative connection with one of said relays.

6. An electrical system comprising in combination an electrical cable, a conductive shield disposed to receive leakage current from a conductor of said cable upon a fault arising in the latter, a transformer, an earthed connection to one point in the secondary winding of the latter, a connection from a second point in said secondary winding to said conductive shield, a source of alternating current supply in electrical connection with the primary winding of said transformer, a relay in the connection between said conductive shield and said secondary winding adapted to open its circuit upon excitation, and means for disconnecting said cable from its supply in operative connection with said relay.

7. A protection system in conjunction with a three-phase three-core electrical cable comprising in combination a conductive shield separating said three cores from one another, a conductive shield surrounding all of said cores, a transformer having a secondary winding comprising two portions wound in opposition, an earthed connection to the junction point of said portions, connections between the terminals of said secondary winding and the respective conductive shields, a source of alternating current supply in electrical connection with the primary winding of said transformer, relays, one in each of said connections, between the secondary winding of said transformer and said conductive shields, a source in the supply wires to said cable, a tripping coil in operative connection with said switch, and an energizing circuit for said tripping coil controlled by each of said relays.

In testimony whereof we have signed our names to this specification.

J. HORACE BOWDEN.
H. F. J. THOMPSON.

Witnesses:
L. E. HAYNES,
H. W. K. JENNINGS.